Aug. 5, 1941.   O. C. PATTERSON   2,251,523
POWER TRANSMISSION MECHANISM
Filed Dec. 8, 1939   2 Sheets-Sheet 1
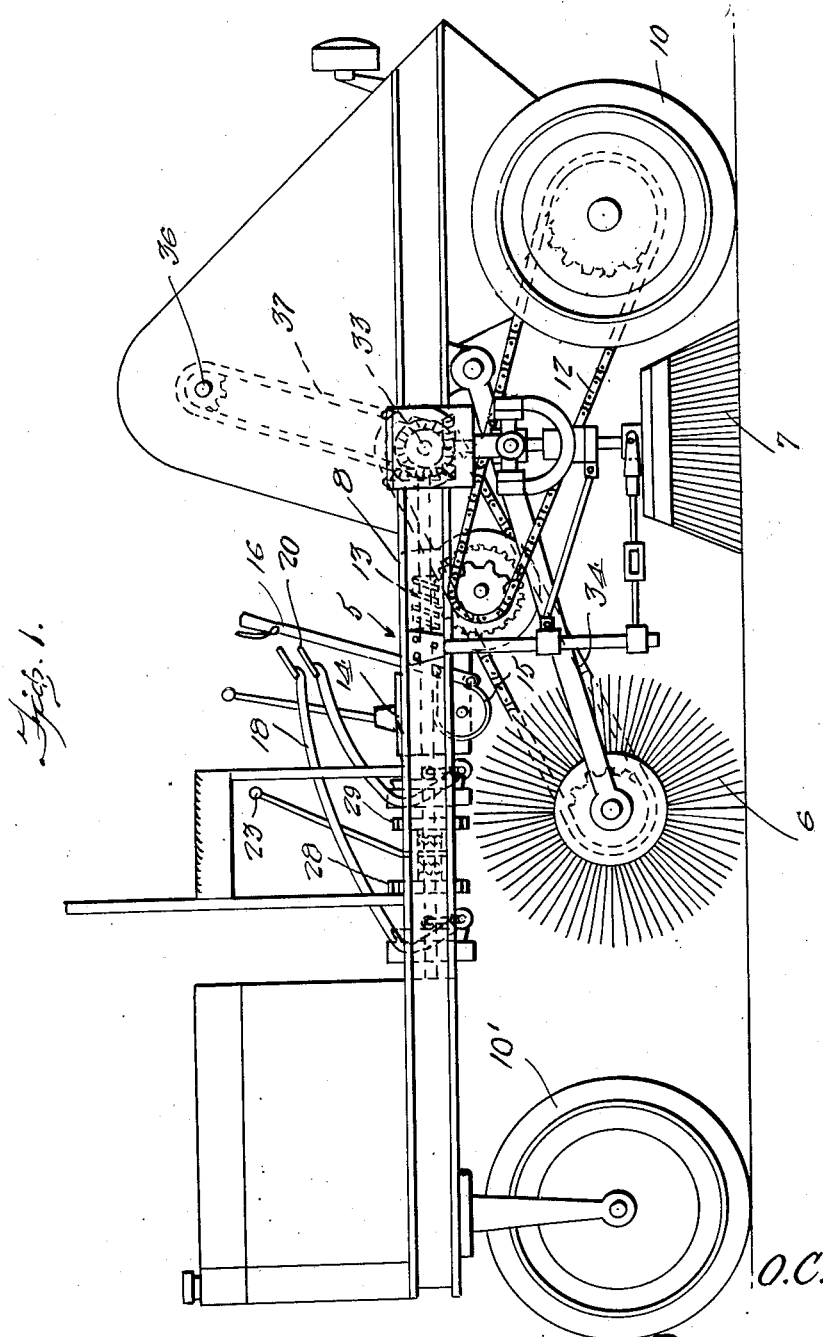
Inventor
O. C. Patterson
By Clarence A. O'Brien
and Hyman Berman
Attorneys

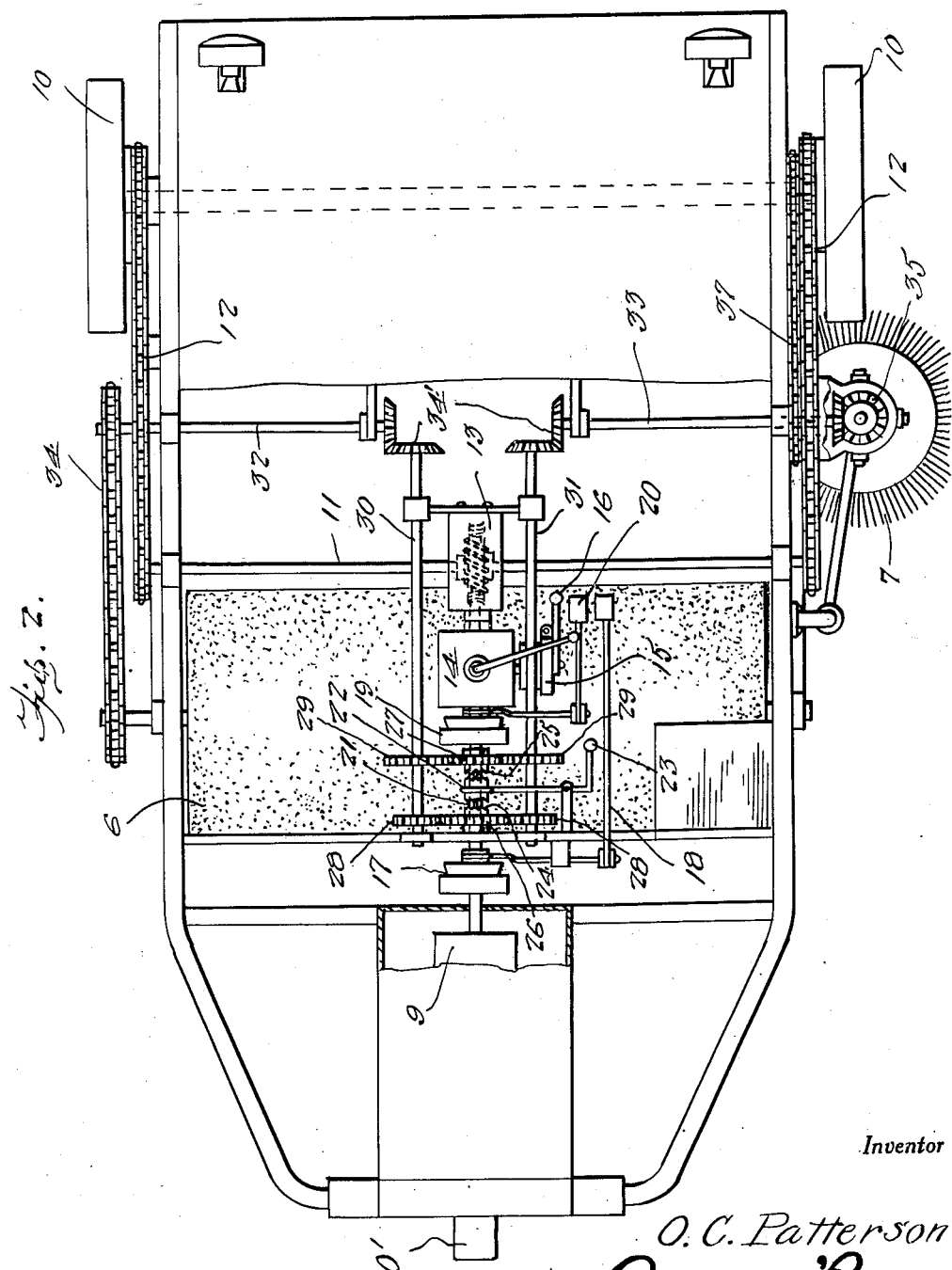

Patented Aug. 5, 1941

2,251,523

UNITED STATES PATENT OFFICE 2,251,523

POWER TRANSMISSION MECHANISM

Oscar C. Patterson, Keokuk, Iowa

Application December 8, 1939, Serial No. 308,244

1 Claim. (Cl. 74—11)

This invention relates to a street sweeping and dirt collecting machine and more particularly to a power transmission mechanism for the brooms of a machine of the kind stated, and has for the primary object the provision of means whereby the brooms may be driven directly from the prime mover or engine used in the propulsion of the machine, so that said brooms may be operated either when the machine is standing idle or in motion and will be driven at substantially constant speed and will not be affected by the slowing down of the machine on grades or the like as in the case of machines of this character which are now in use due to the brooms being driven only during the forward motion of the machine and from the ground wheels thereof.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a conventional type of street sweeping and dirt collecting machine and equipped with a power transmission mechanism constructed in accordance with my invention.

Figure 2 is a top plan view, partly in section, illustrating the same.

Referring in detail to the drawings, the numeral 5 indicates a machine especially adapted for sweeping roadways or streets and the gutters thereof and at the same time collecting the dirt or other refuse and consists primarily in rotatably supported brooms 6 and 7 and a main frame 8 on which is mounted a prime mover or engine 9. The forward end of the main frame is supported by traction wheels 10 and the rear end of the frame is supported by a pilot type steering wheel 10'. As to the mounting of the brooms 6 and 7 it is to be understood that it is of conventional construction and forms no part of the present invention. The traction wheels 10 are connected to live axles 11 by sprocket chains 12 and the live axles form a part of a differential 13 to which is coupled a variable speed transmission 14 including a suitable brake mechanism 15 having a control lever 16. The usual clutch of the engine 9 is indicated by the character 17 and is operated by a control mechanism 18. The transmission 14 is equipped with a clutch 19 operated by a control mechanism 20. The clutches 17 and 19 are spaced and arranged in alignment and connecting said clutches is a part of the present invention which includes a shaft 21 having splined thereon a clutch element 22 operated by a control mechanism 23.

Mounted on the shaft 21 at opposite sides of the clutch element 22 are clutch elements 24 and 25 forming integral parts of gears 26 and 27. The gears are rotatably supported by the shaft 21. Meshing with the gear 26 are gears 28 secured on shafts 30 and 31. Meshing with the gear 27 are gears 29 which are also secured on the shafts 30 and 31. The gears 28 and 29 as well as the gears 26 and 27 are of different ratios whereby through the operation of the clutch element 22 the shafts 30 and 31 may be driven at different speeds. The shafts 30 and 31 are suitably journaled on the main frame and are geared to shafts 32 and 33, as shown at 34'. The shafts 32 and 33 extend in opposite directions and at right angles to the shafts 30 and 31 and are suitably journaled on the main frame 5 and a sprocket chain 34 connects the shaft 32 to the broom 6 while the shaft 33 is geared to the shaft of the broom 7, as shown at 35. The shaft 33 is also connected to a conveyor shaft 36 by a sprocket chain 37.

When the clutch 17 is engaged and the clutch 19 disengaged the operator of the device may bring the brooms 6 and 7 in operation by power received from the engine 9 by operating the control mechanism 23. At this time the machine will be standing idle and when it is desired to advance over an area with the machine the clutch 19 is engaged and should this area be on a steep grade the transmission 14 provides variable speeds for the machine. However, it will be seen that the brooms 6 and 7 will be driven by the engine 9 at a substantially constant speed regardless of the speed of travel of the machine over the area which permits a more efficient cleaning operation to be brought about and eliminates the present practice of having to go over the same area several times in order for the brooms to clean the area and which is necessary with machines now in use due to the fact that the brooms receive their power from the traction wheels and consequently the speed of operation thereof slows down due to the slowing down of the machine on a graded area.

It is believed that the foregoing description when taken in connection with the drawings will fully set forth the construction and advantages of this invention to those skilled in the art to which such a device relates, so that further detailed description will not be required.

Having thus described the invention, what I claim is:

In a device of the class described, a drive shaft, a driven shaft, an intermediate shaft located between the two shafts and in longitudinal alignment therewith, clutch means for connecting one end of the intermediate shaft with the drive shaft, clutch means for connecting the other end of the intermediate shaft with the driven shaft, a second driven shaft having an end portion parallel to the intermediate shaft, a third driven shaft having an end portion parallel to the intermediate shaft with the third shaft arranged on the opposite side of the drive, driven and intermediate shafts from that of the second driven shaft, a pair of gears loosely arranged on the intermediate shaft, a pair of gears fastened to each of the second and third driven shafts and meshing with the first pair of gears, the gears of one set being of a different size to those of the other set and clutch means for connecting either one of the gears on the intermediate shaft with the intermediate shaft or for disconnecting both said gears from said intermediate shaft.

OSCAR C. PATTERSON.